United States Patent
Derenes et al.

(10) Patent No.: US 11,435,263 B2
(45) Date of Patent: Sep. 6, 2022

(54) PYLON FOR SUPPORTING AN AIRCRAFT TURBOMACHINE

(71) Applicant: SAFRAN AIRCRAFT ENGINES, Paris (FR)

(72) Inventors: Jacky Raphael Michel Derenes, Moissy-Cramayel (FR); Michael Daniel Joel Bertin, Moissy-Cramayel (FR); Etienne Romain Pascal Grenier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 561 days.

(21) Appl. No.: 16/534,864

(22) Filed: Aug. 7, 2019

(65) Prior Publication Data
US 2020/0049591 A1 Feb. 13, 2020

(30) Foreign Application Priority Data
Aug. 9, 2018 (FR) ...................................... 1857409

(51) Int. Cl.
*F16M 11/00* (2006.01)
*G01M 15/14* (2006.01)
*G01M 15/02* (2006.01)

(52) U.S. Cl.
CPC ............ *G01M 15/14* (2013.01); *G01M 15/02* (2013.01)

(58) Field of Classification Search
CPC ............................. G01M 15/14; G01M 15/02
See application file for complete search history.

(56) References Cited

U.S. PATENT DOCUMENTS

| 2,481,502 | A | * | 9/1949 | Downing | ............ B64C 29/0025 244/6 |
| 8,161,806 | B1 | | 4/2012 | Weickert et al. | |
| 2016/0238032 | A1 | * | 8/2016 | Hill | ............................ F02C 7/20 |
| 2018/0283960 | A1 | * | 10/2018 | Giordan | ................ G01M 15/14 |

FOREIGN PATENT DOCUMENTS

| CN | 207487978 U | 6/2018 |
| FR | 3044093 A1 | 5/2017 |
| WO | 2010/122052 A1 | 10/2010 |

OTHER PUBLICATIONS

Preliminary Research Report and Written Opinion received for French Application No. 1857409, dated May 23, 2019, 8 pages (1 page of French Translation CoverSheet and 7 pages of original document).

* cited by examiner

*Primary Examiner* — Amy J. Sterling
(74) *Attorney, Agent, or Firm* — Womble Bond Dickinson (US) LLP

(57) ABSTRACT

A pylon for supporting an aircraft turbomachine, in particular for a test bench, the pylon having a generally elongated shape along an axis and including, at a first longitudinal end, first members for fixing to a turbomachine and, at a second longitudinal end, second members for fixing to a base plate, the pylon being traversed by at least one fluid pipe including a first end for connecting to the turbomachine and a second end for connecting to a fluid supply circuit, wherein the at least one pipe includes a movable portion movable in translation along the axis so as to be able to adjust the position along the axis of the first connecting end relative to the first longitudinal end. It also concerns a method of mounting an aircraft turbomachine on such a pylon.

9 Claims, 5 Drawing Sheets

PYLON FOR SUPPORTING AN AIRCRAFT TURBOMACHINE

TECHNICAL FIELD

This invention concerns a pylon for supporting an aircraft turbomachine, in particular for a test bench. It concerns more particularly the connection of fluid pipes from this pylon to the turbomachine.

BACKGROUND

Turbomachines require for their development or for checking their performance at the end of maintenance, and in order to be tested before being put into flight, a passage on ground installations, called test benches. These test benches allow the turbomachines to operate as if they were installed on an aircraft. These benches are generally masonry installations in which a fixed pylon is installed comprising at least one fluid pipe such as gas configured to be connected to a pipe of the turbomachine to be tested.

The fluid pipes of the pylon are rigid at least in a portion of the connection to the pipe of the turbomachine. Thus, when docking the turbomachine, which is heavy and difficult to handle, there is a risk of damaging the turbomachine in its portion of connection to the pylon.

The invention offers a simple, effective and economical solution to this problem.

DISCLOSURE OF THE INVENTION

For this purpose, the invention concerns a pylon for supporting an aircraft turbomachine, in particular for a test bench, the pylon having a generally elongated shape along an axis and comprising, at a first longitudinal end, first members for fixing to a turbomachine and, at a second longitudinal end, second members for fixing to a base plate, the pylon being traversed by at least one fluid pipe comprising a first end for connecting to the turbomachine and a second end for connecting to a fluid supply circuit, characterized in that the at least one pipe comprises a movable portion movable in translation along the axis so as to be able to adjust the position along the axis of the first connecting end relative to the first longitudinal end.

Thus, this makes it possible to connect the fluid pipe to the turbomachine without damaging the latter. Indeed, the movable portion and consequently the rigid part of the pipe is moved in translation along said axis. It is then possible to vary the position of the first end for connecting the pipe to the turbomachine between a first position, called for example the high position, and a second position called for example the low position. In the high position, the first end for connecting the pipe to the turbomachine is in a position allowing it to be connected to a similar pipe of the turbomachine. In other words, said first connecting end is located at a first predetermined distance from said first longitudinal end. In the low position, the first end for connecting the pipe to the turbomachine is set back, at a predetermined distance, from the first longitudinal end of the pylon. In other words, said first connecting end is located at a second predetermined distance from said first longitudinal end, said first predetermined distance being greater than said second predetermined distance.

Preferably, said at least one pipe comprises a flexible portion located, for example, at the second end for connecting to the base plate.

Advantageously, said movable portion passes through an orifice of a plate substantially perpendicular to said axis and carries two fixed rings, of which the first is located on one side of the plate and forms a stop and of which a second is located on the other side of the plate, a compression spring bearing on the second ring and on the plate to bias the second ring to move away from the plate.

Thus, the solution allows the pipes to be kept in a high position and allows freedom of intrinsic movement of the pipe due, for example, to thermal expansion or to vibrations.

Advantageously, the plate is connected to a pylon body by means for guiding in translation along said axis.

Thus, the adjustment movements of the movable portion of said pipe are guided substantially along said axis.

Advantageously, the translation guiding means comprise two telescopic rods, of which the ends are respectively fixed to the plate and to the body of the pylon.

According to another embodiment, the translation guiding means include at least one worm screw.

Thus, it is possible to select the position of the movable portion from a plurality of positions along the worm screw.

Preferably, the plate is connected to or comprises at least one handle for moving the plate and therefore for adjusting the position of the movable portion.

Thus, the movement and adjustment of the movable portion of said pipe are facilitated.

Advantageously, the pylon comprises a plurality of fluid pipes and the plate comprises a plurality of orifices traversed by said pipes.

Thus, it is possible to move simultaneously the movable portions of several pipes.

Advantageously, the pylon comprises means for locking said movable portion in at least one position along said axis.

Thus, it is easy and quick to switch from a high position to a low position when adjusting the position of the movable portion of the pipes.

The purpose of this invention is also a method of mounting an aircraft turbomachine on a pylon comprising at least one of the above-mentioned characteristics, comprising:

a) a step of moving the movable portion of the pipes towards the second longitudinal end of the pylon so that the first connecting end is located at a first predetermined distance from the first longitudinal end of the pylon, b) a step of docking the turbomachine on said first longitudinal end, c) a step of moving the movable portion of the pipes towards the first longitudinal end of the pylon so that the first connecting end is located at a second predetermined distance from the first longitudinal end, said first predetermined distance being greater than said second predetermined distance, and d) a step of connecting said at least one pipe to the turbomachine, the turbomachine being fixed to the pylon before step c) or after step c) or d).

This method allows an aircraft turbomachine to dock on a pylon without risk of damage to said turbomachine in its portion for connecting to said pylon.

DESCRIPTION OF THE FIGURES

This invention shall be better understood and other details, characteristics and advantages of this invention shall appear more clearly when reading the description of the following non-limitative example, with reference to the annexed drawings on which.

DETAILED DESCRIPTION

In this disclosure, the terms "lower", "upper", "proximal", "distal", "high" and "low" are used to refer to the usual positioning of the constituent elements of the pylon according to the invention, the terms "proximal", "lower" and "low" being understood as being as close as possible to the base plate while the terms "distal", "upper" and "high" are understood as being as close as possible to the turbomachine docked to the pylon according to the invention.

Figure 1:
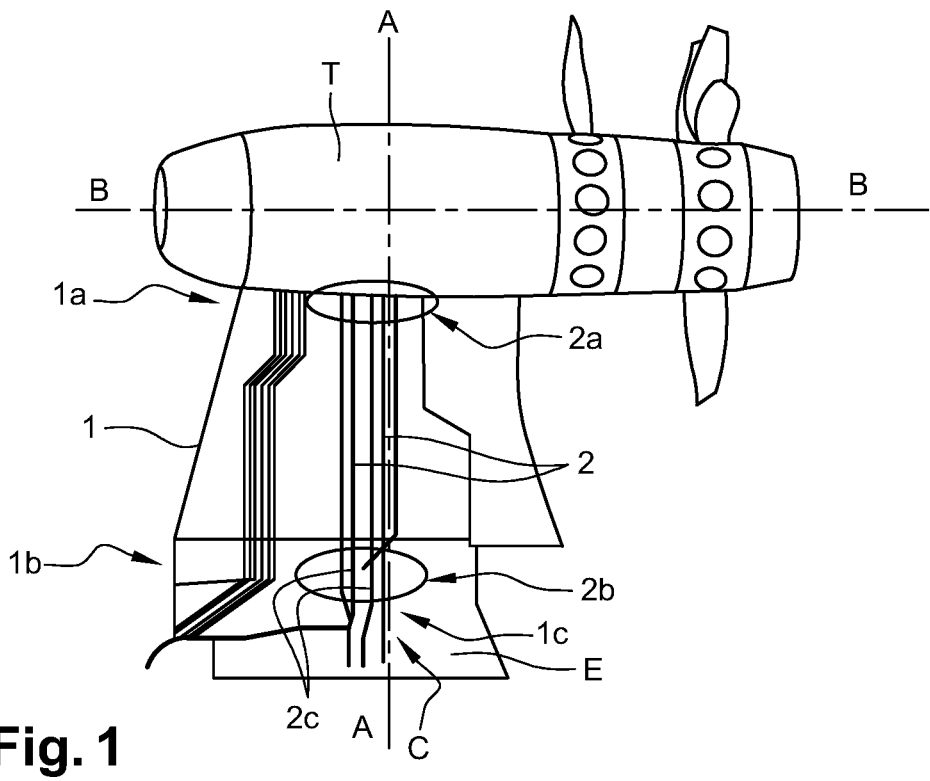
FIG. 1 is an overall side view illustrating a turbomachine positioned on a pylon according to the invention.
Figure 2:
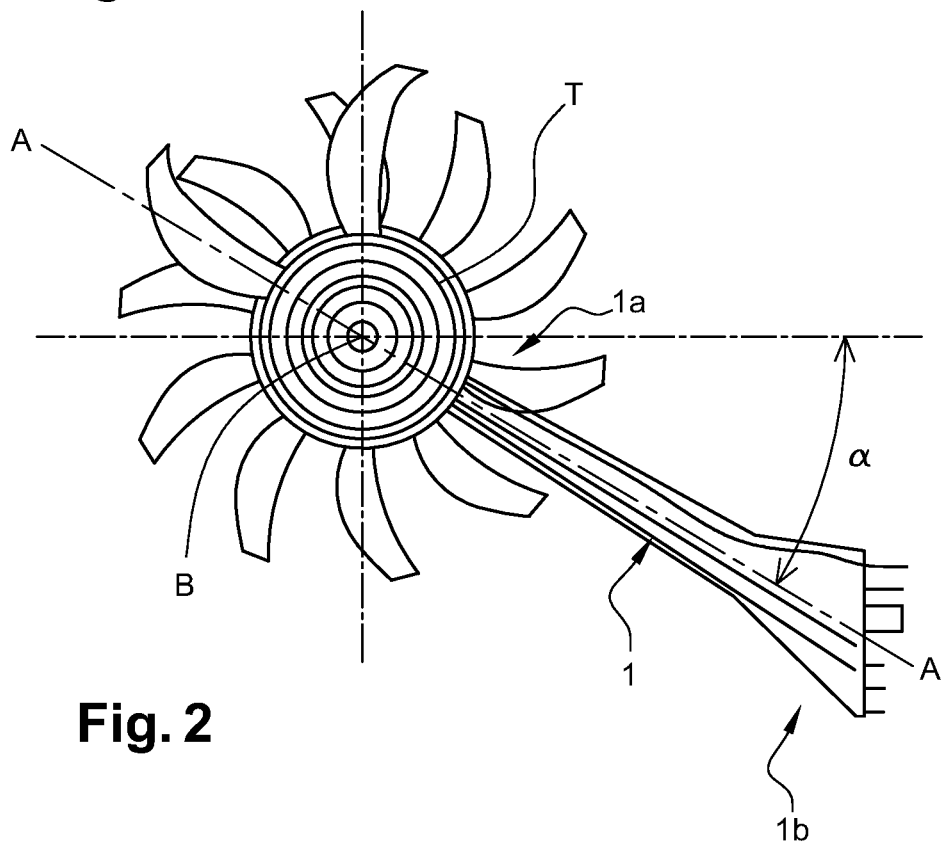
FIG. 2 is a front view of the turbomachine and the pylon according to the invention.
Figure 3:
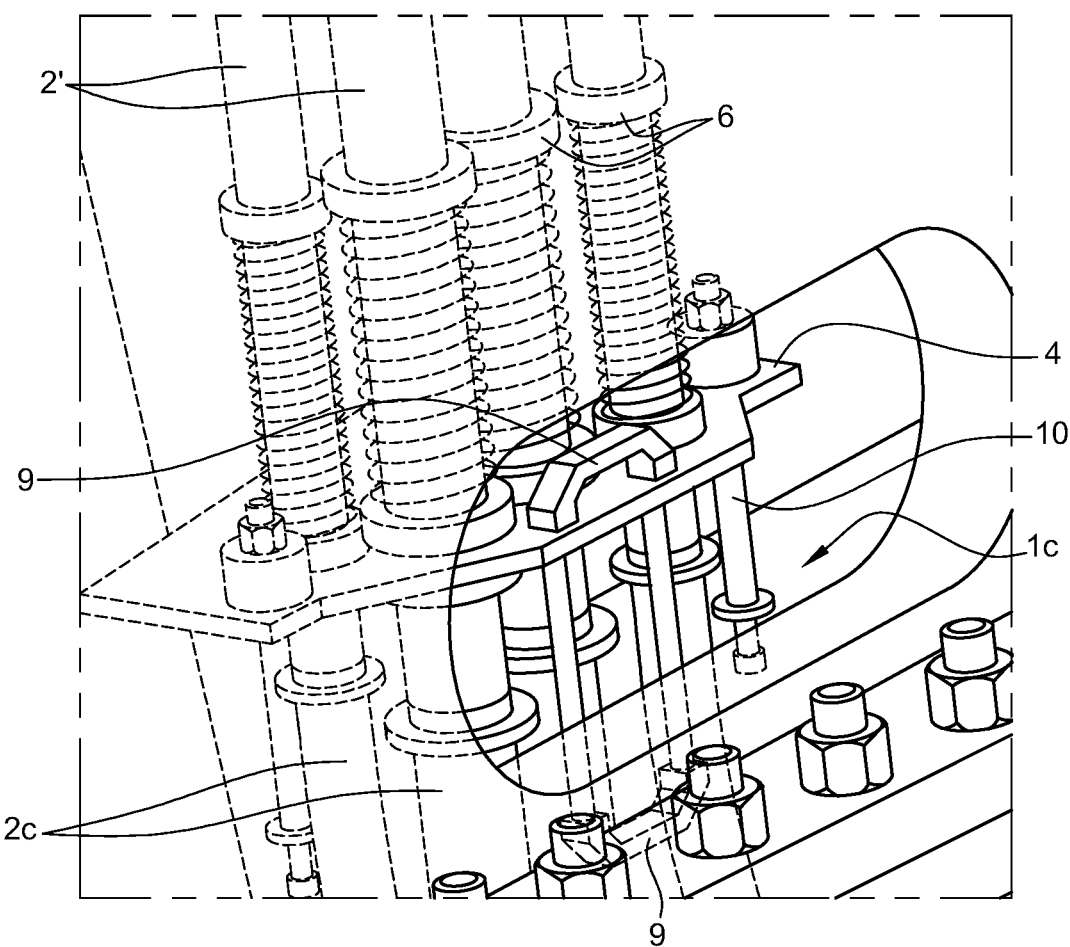
FIG. 3 shows a perspective detail view of the elements of the pylon allowing the position of the movable portion of the pipes to be adjusted according to the invention.
Figure 4:
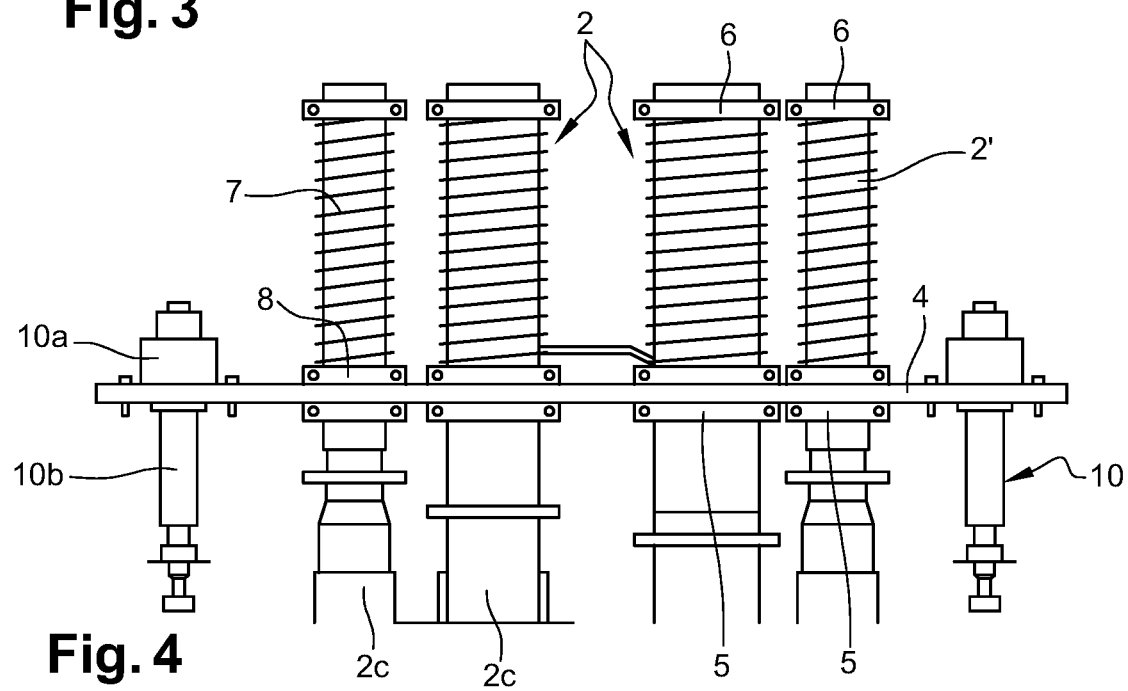
FIG. 4 shows a partial cross-sectional view along the axis A-A.

FIGS. 1 and 2 illustrate a pylon 1 for supporting an aircraft turbomachine T according to the invention. This pylon 1, in particular for a test bench, is surmounted by a turbomachine T and has a generally elongated shape along an axis A-A. At a first longitudinal end 1a or distal end 1a, the pylon comprises first members for fixing to a turbomachine T, the turbomachine T comprising, in a zone for connecting to the pylon 1, additional members for fixing to the pylon. At a second longitudinal end 1b or proximal end 1b, the pylon comprises second members for fixing to a base plate E itself fixed to the ground or to a wall of a masonry installation comprising the pylon 1. The base plate E includes, in a zone for connecting to the pylon 1, additional members for fixing to the pylon.

The turbomachine T has a longitudinal axis B-B substantially perpendicular to the axis A-A when the turbomachine T is docked on the pylon 1. The axis A-A of the pylon forms an angle α with respect to a horizontal plane passing through a radial plane of the turbomachine T, for example an angle α between 30° and 40°, reproducing the inclination of an aircraft pylon.

For example, the pylon 1 is tubular and is traversed longitudinally by at least one pipe 2 and, as illustrated in this application, by several fluid pipes 2 and cables required for testing the turbomachine on a test bench. In particular, the pylon 1 comprises at least one fluid pipe 2 comprising a first end 2a for connecting to the turbomachine T and a second end 2b for connecting to a fluid supply circuit C. According to the example illustrated, the pylon 1 comprises at least four fluid pipes 2, allowing for example to circulate the fluids, such as gas, between the base plate E and the turbomachine T.

The or each fluid pipe 2 of the pylon 1 comprises a movable portion 2' in translation along the axis A-A so that the position of the first connecting end 2a can be adjusted with respect to the first longitudinal end 1a of the pylon 1, along the axis A-A.

The movable portion 2' is made up of a rigid portion of pipes 2.

The adjustment of the position of the movable portion 2' and, therefore, the adjustment of the position of the first connecting end 2a of the pipes 2 is made possible, according to the example of embodiment illustrated in no way limiting, by a flexible portion 2c of the pipes 2. Another possible solution would be to use, for example, pipes 2 having a telescopic portion.

This arrangement allows the removal of the pipe(s) 2 at the distal end 1a of the pylon 1, i.e. it allows the first connecting end 2a of each pipe 2 to be temporarily moved away or spaced apart from the first longitudinal end 1a of the pylon 1, for example during the docking phase of the turbomachine T to the pylon 1.

According to this example of embodiment, which is not limitative, illustrated in this application, the flexible portion 2c allowing the position of the movable portion 2' of each pipe 2 to be adjusted is located at the second end 2b for connecting to the base plate E. This flexible portion could be installed anywhere along each pipe 2.

With reference to FIGS. 3 to 6, the movable portion 2' of each pipe 2 passes through an orifice 3 of a plate 4, the latter extending substantially perpendicular to the axis A-A of the pylon 1.

The movable portion 2' of each pipe 2 carries two fixed rings 5, 6. A first ring 5 is located on a lower side of the plate 4 and forms a stop and a second ring 6 is located on the other side of the plate 4, a compression spring 7 bearing on the second ring 6 and on the plate 4 to bias the second ring 6 to move away from the plate 4. For example, the compression spring 7 is supported on the plate 4 by a third ring 8 located on an upper side of the plate 4.

In the case where the pylon 1 includes several fluid pipes 2, the plate 4 includes several orifices 3 traversed by the pipes 2, so that all the pipes 2 can be moved simultaneously to adjust the position of their respective first connecting end 2a, thus simplifying the docking operations of a turbomachine T on a pylon and, consequently, the maintenance or test operations on the turbomachine T.

According to the example of embodiment illustrated, the plate 4 is connected to a pylon body 1c by means for guiding in translation along the axis A-A.

According to the example of embodiment illustrated in FIGS. 3 to 8, the translation guiding means comprise two telescopic rods 10 whose ends are fixed to the plate 4 and to the body of the pylon 1 respectively. More precisely, the telescopic rods 10 comprise, on the one hand, a hollow cylinder 10a fixed to the plate 4, for example by means of fixing tabs 11 screwed into the plate 4 and, on the other hand, a cylindrical rod 10b, fixed to the pylon 1 and configured to slide in the hollow cylinder 10a. Preferably, the two telescopic rods 10 are arranged on a straight line d located along a longitudinal axis of the plate 4 and at two opposite ends of this plate.

Figure 7:
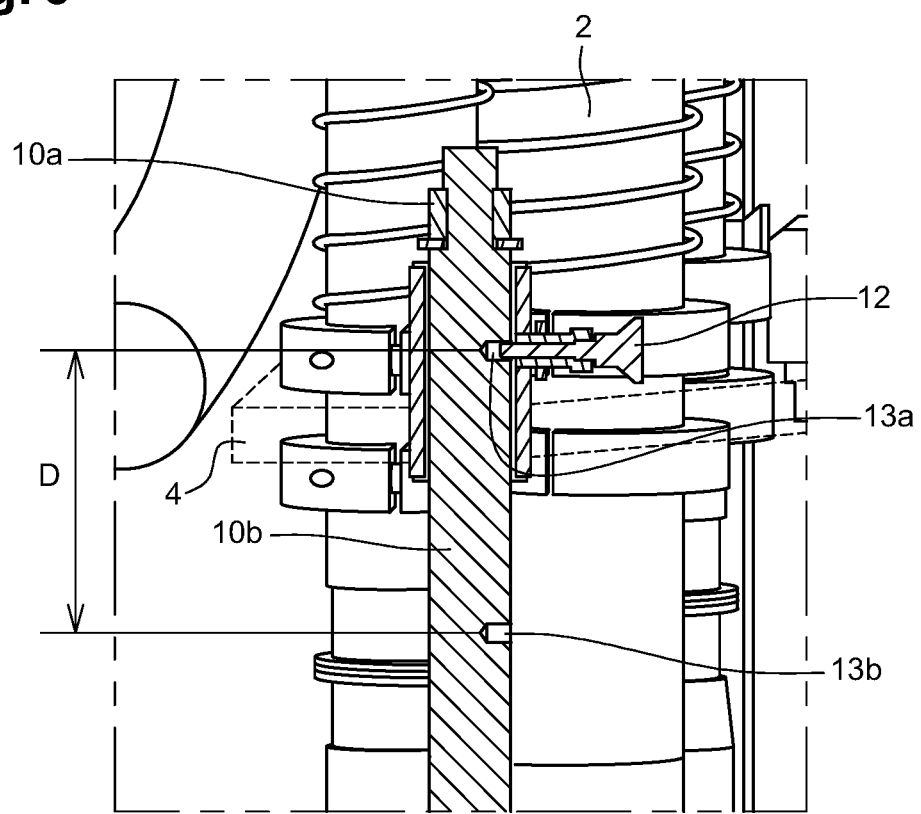
FIG. 7 is a detail view in longitudinal section of a guiding axis allowing the position of the movable portion of the pipes of the pylon to be adjusted according to the invention.
Figure 8:
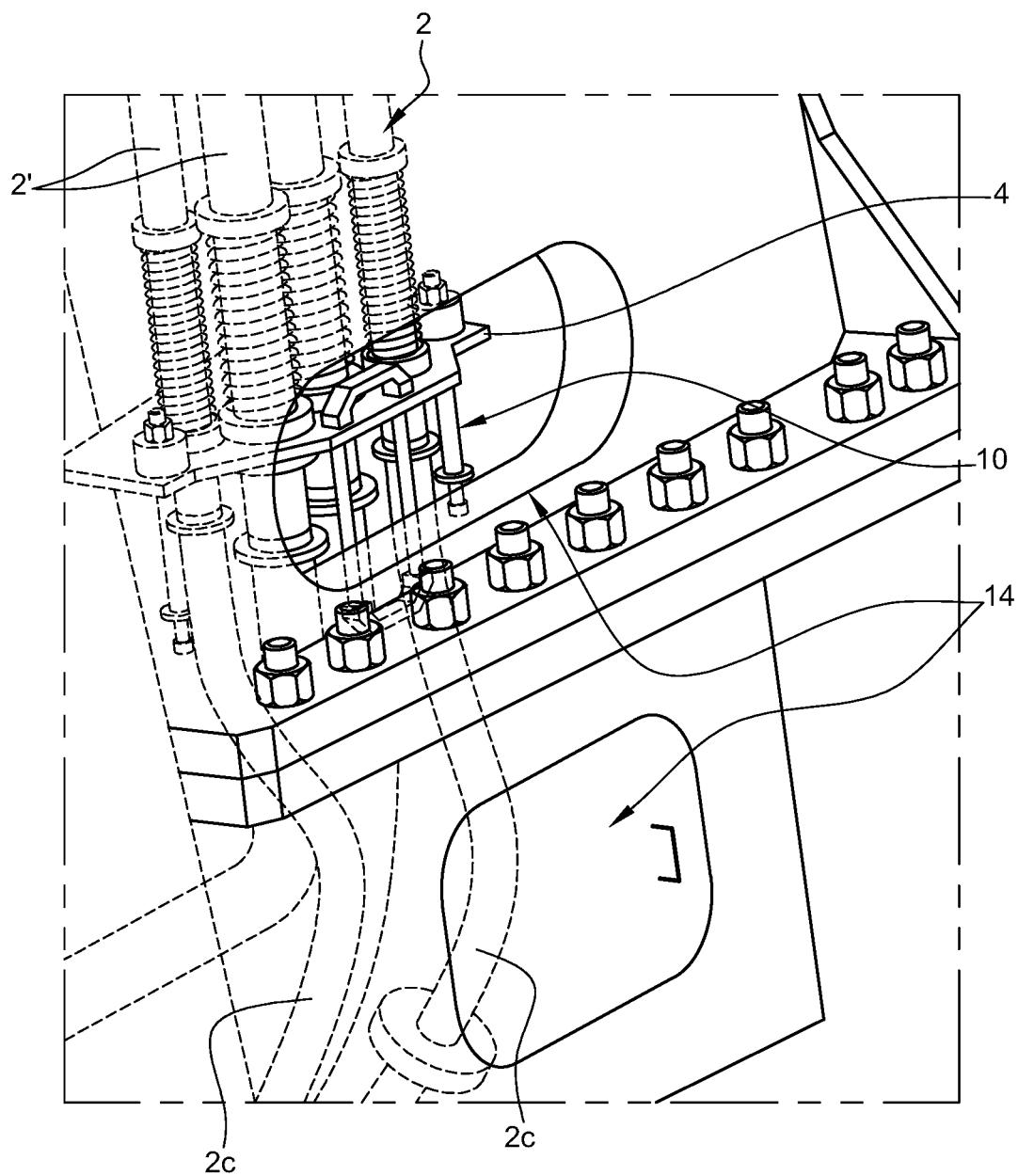
FIG. 8 is a perspective detail view showing access hatches provided in the body of the pylon according to the invention.

With reference to FIG. 7, the adjustment of the position of the movable portion 2' of the pipe(s) 2 is carried out between a high position allowing the connection of the pipes 2 of the pylon 1 to similar pipes of the turbomachine T and a low position in which the movable portions 2' of the pipes 2 are set back with respect to the first longitudinal end 1a of the pylon 1.

The pylon 1 also comprises means for locking the position of the movable portion 2' of the pipe(s) 2 in at least one position, for example high position or low position.

According to the illustrated example of embodiment, the locking means are constituted by pins 12 which can be engaged in high notches 13a and low notches 13b provided in the telescopic rods 10 constituting the guiding means, and in particular in the cylindrical rods 10b of the latter. These pins 12 are retractable and pass through an orifice provided in a peripheral wall of the hollow cylinder 10a. The pins 12 then lock the positioning of the movable portions 2' of the pipes 2 in the high position or low position by engaging respectively in the high notches 13a or low notches 13b of the cylindrical rods 10b.

For example, the high and low positions are spaced apart from a distance D sufficient to allow the removal of the movable portions 2', and therefore from the first ends 2a for connecting the pipes 2 to the turbomachine T so as to ensure safe docking without risk of damage to the latter. For example, the high and low positions, and therefore the high notches 13a and low notches 13b are 100 mm apart.

According to another example of a non-represented embodiment, the translation guiding means comprise at least one worm screw, so that a plurality of erasing positions of the movable portions 2' of the pipes 2 can be selected.

Figure 6:
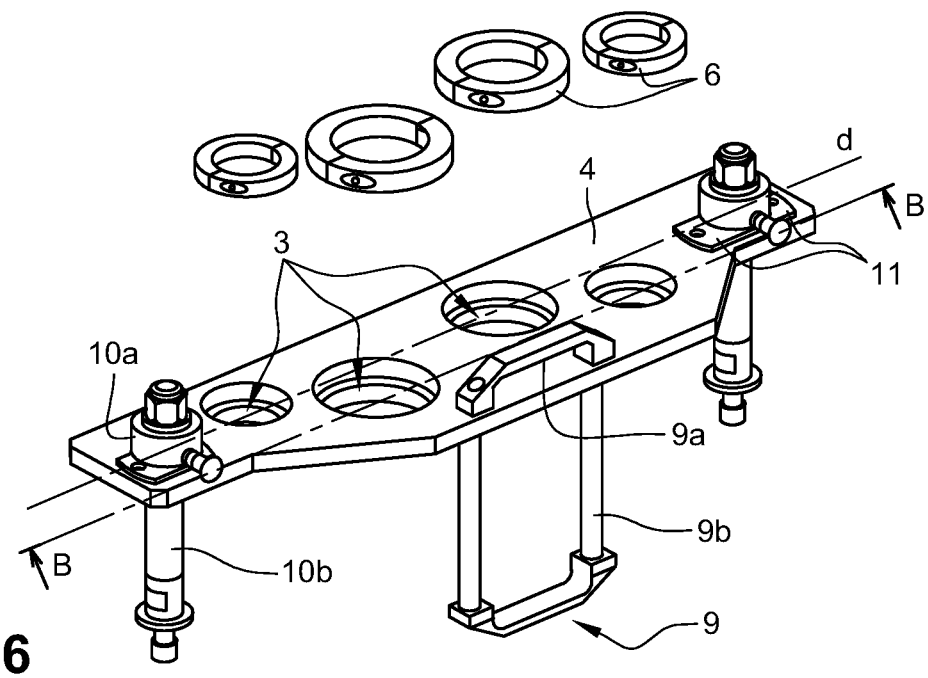
FIG. 6 is a partial detail view in exploded perspective of elements allowing the adjustment of the position of the movable portion of the pipes of the pylon according to the invention.

According to the example of embodiment illustrated in FIG. 6, the plate 4 is connected to or comprises at least one handle 9 allowing the movement of the plate 4 and thus the adjustment of the position of the movable portion 2' of the pipe(s) 2. This handle 9 has a general O-shaped shape and comprises one or two gripping areas that can be grasped by an operator to adjust the position of the movable portion 2' of the pipes 2.

The handle 9 extends in a plane perpendicular to the plate 4 and is cut by the plate 4 in order to define two gripping zones, namely an upper gripping zone 9a and a lower gripping zone 9b.

The access to the translation guiding means, and in particular to the handle 9, is made possible by the arrangement of at least one hatch 14 in the body of the pylon 1. According to the example of embodiment illustrated in FIG. 8, two hatches 14 for access to the translation guiding means are provided in the body of the pylon 1 and allow the handle 9 to be gripped in order to move the assembly formed by the plate 4 and the movable portions 2' of the pipes 2 between an high position and a low position.

This invention also concerns a method for mounting an aircraft turbomachine T on a pylon 1 as described in this disclosure and comprising at least one fluid pipe 2.

In an initial starting position, the pipes 2 are locked in a high position wherein the pins 12 are engaged in the high notches 13a of the telescopic rods 10.

Figure 5A:
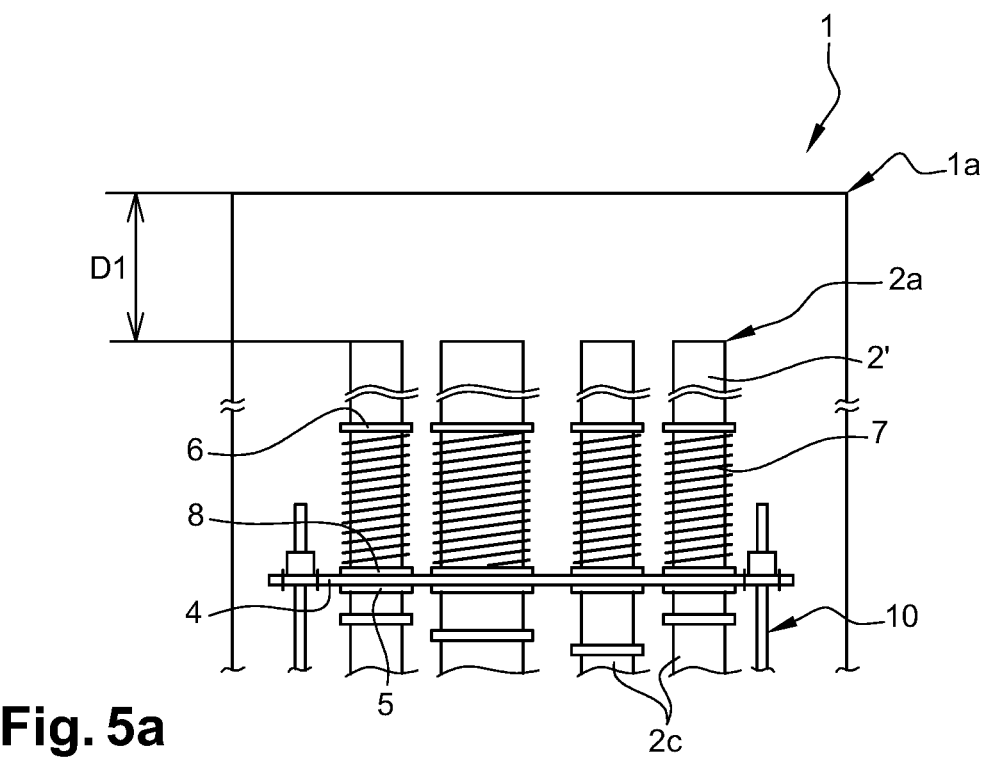
FIG. 5a is a detailed view showing schematically the positions of the first connecting ends of the pipes at a first predetermined distance $D_1$ from the first longitudinal end of the pylon.

In a first step a), the position of the movable portion 2' of the at least one pipe 2 is moved towards the second longitudinal end 1b of the pylon 1 so that the first connecting end 2a of the pipes 2 is located at a first predetermined distance $D_1$ from the first longitudinal end 1a of the pylon 1 (FIG. 5a). For this purpose, for example, the pins 12 are released from the high notches 13a and, for example, by manoeuvring on the lower zone 9b of the handle 9 through one of the hatches 14, the assembly consisting of the plate 4 and the pipes 2 is moved downwards, until the pins 12 face the low notches 13b. The pins 12 are then engaged in these low notches 13b to lock the assembly consisting of the plate 4 and the pipes 2 in the low position. Thus, the movable portions 2' and, consequently, the first connecting ends 2a of the pipes 2 are moved down and away from the distal end 1a for connecting the pylon to the turbomachine T. In this way, a turbomachine T can be approached from the pylon 1 without risk of damage to the turbomachine T through the first rigid connecting ends 2a of the pipes 2.

In a second step b), the turbomachine T is docked in a manner known per se on the first longitudinal end 1a for connecting the pylon 1 to the turbomachine.

Figure 5B:
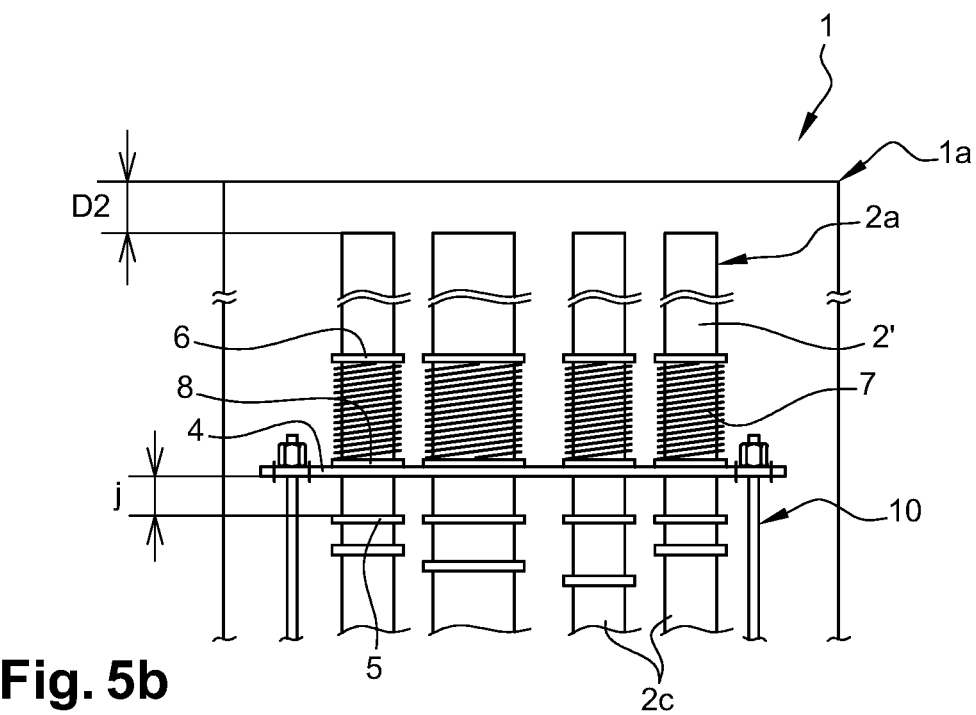
FIG. 5b is a detailed view showing schematically the positions of the first connecting ends of the pipes at a second predetermined distance $D_2$ from the first longitudinal end of the pylon.

In a third step c), the movable portion 2' of the pipes 2 is moved towards the first longitudinal end 1a of the pylon 1 so that the first connecting end 2a of the pipes 2 is located at a second predetermined distance $D_2$ from the first longitudinal end 1a of the pylon 1 (FIG. 5b). The first predetermined distance $D_1$ is greater than the second predetermined distance $D_2$. To do this, the pins 12 are released from the low notches 13b and, for example by manoeuvring on the upper zone 9a of the handle 9, the assembly consisting of the plate 4 and the pipes 2 is moved upwards, until the pins 12 are moved back facing the high notches 13a. The pins 12 are then engaged in these high notches 13a to lock the assembly consisting of the plate 4 and the pipes 2 in the high starting position.

The rings 5 and 6 are fixed on pipes 2 and the compression springs 7 bear on the one hand against the ring 6 and on the other hand against the plate 4, directly or via rings 8. Thus, when moving the pipes 2 towards the first longitudinal end 1a of the pylon 1, the compression springs 7 are compressed between the rings 6 and the plate 4 (or rings 8 if applicable). In other words, the distance between the rings 6 and the plate 4 (or rings 8, if applicable) when the pipes 2 are in the high position is less than the distance between the rings 6 and the plate 4 (or the rings 8, if applicable) when the pipes 2 are in the low position. The compression springs 7 then exert a force to move the rings 6 away from the plate 4 (or the rings 8, if applicable).

The compression springs 7 thus enable the pipes 2 to be held in the high position by bearing on the plate 4, directly or via the rings 8. Otherwise, the pipes 2 would slide down in the orifices 3, in particular when disconnecting the connections between the pipes 2 of the pylon 1 and those of the turbomachine T, generating harmful forces on the connections of the pipes 2 of the pylon 1 and the turbomachine T.

Preferably and advantageously, a clearance j is provided between the ring 5 and the plate 4 when the pipes 2 are in the high position. This clearance j allows the movement of the pipes 2 induced by their expansion, for example, along the axis A-A. Indeed, since the plate 4 is fixed to the pylon body 1c by means of telescopic rods 10, it is necessary to consider the axial displacements of the pipes 2. This clearance j is between 5 mm and 10 mm and is preferably of the order of 8 mm.

Thus, the movable portions 2' and, consequently, the first connecting ends 2a of the pipes 2 are moved upwards and closer to the first longitudinal end 1a for connecting the pylon 1 to the turbomachine T.

In a last step d), the at least one pipe 2 is connected to the turbomachine T. More precisely, each pipe 2 is connected, via its first connecting end 2a, to a similar pipe of the turbomachine T.

In the method according to the invention, the turbomachine T is fixed to the pylon 1 before or after step c).

It is noted that in this presentation reference is made to a test bench pylon, however, it is noted that this invention could be applied to an aircraft pylon.

The invention claimed is:

1. A pylon for supporting an aircraft turbomachine (T), in particular for a test bench, the pylon having a generally elongated shape along an axis and comprising, at a first longitudinal end, first members for fixing to a turbomachine and, at a second longitudinal end, second members for fixing to a base plate, the pylon being traversed by at least one fluid pipe comprising a first end for connecting to the turbomachine and a second end for connecting to a fluid supply circuit, wherein the at least one pipe comprises a movable portion movable in translation along the axis so as to be able to adjust the position along the axis of the first connecting end relative to the first longitudinal end.

2. The pylon according to claim 1, wherein the at least one pipe comprises a flexible portion located, for example, at the second end for connecting to the base plate.

3. The pylon according to claim 1, wherein the movable portion passes through an orifice of a plate substantially perpendicular to said axis and carries two fixed rings of which a first is located on one side of the plate and forms a stop and of which a second is located on the other side of the plate, a compression spring bearing on the second ring and on the plate to bias the second ring to move away from the plate.

4. The pylon according to claim 3, wherein the plate is connected to a pylon body by means for guiding in translation along the axis.

5. The pylon according to claim 4, wherein the translation guiding means comprise two telescopic rods of which the ends are respectively fixed to the plate and to the body of the pylon.

6. The pylon according to claim 4, wherein the translation guiding means comprise at least one worm screw.

7. The pylon according to claim 3, wherein the plate is connected to or comprises at least one handle for moving the plate and thus for adjusting the position of the movable portion.

8. The pylon according to claim 3, wherein the pylon comprises a plurality of fluid pipes and the plate comprises a plurality of orifices traversed by the pipes.

9. The pylon according to claim 1, wherein it comprises means for locking the movable portion in at least one position along the axis.

* * * * *